United States Patent [19]

Mitsche et al.

[11] 3,716,597
[45] Feb. 13, 1973

[54] PROCESS FOR ALKYLATING AROMATIC HYDROCARBONS

[75] Inventors: Roy T. Mitsche, Island Lake; Edward Michalko, Lombard, both of Ill.

[73] Assignee: Universal Oil Products Company, Des Plaines, Ill.

[22] Filed: Dec. 28, 1970

[21] Appl. No.: 102,058

Related U.S. Application Data

[63] Continuation-in-part of Ser. No. 20,024, March 16, 1970, Pat. No. 3,677,973.

[52] U.S. Cl. ............................................260/671 C
[51] Int. Cl. ..................................................C07c 3/52
[58] Field of Search ..........................260/671, 671 C

[56] References Cited

UNITED STATES PATENTS 3,436,174   4/1969   Sand........................................23/113
3,562,345   2/1971   Mitsche................................260/672

Primary Examiner—Curtis R. Davis
Attorney—James R. Hoatson, Jr. and Robert W. Erickson

[57] ABSTRACT

A process for alkylating alkylatable aromatic hydrocarbons using a catalyst comprising a zeolite with a mordenite crystal structure containing alumina fixed in combination therewith.

11 Claims, No Drawings

PROCESS FOR ALKYLATING AROMATIC HYDROCARBONS

CROSS-REFERENCES TO RELATED APPLICATIONS

This application is a continuation-in-part of our copending application Ser. No. 20,024, filed on Mar. 16, 1970, now U.S. Pat. No. 3,677,973, all the teachings of which copending application are incorporated herein by specific reference thereto.

BACKGROUND OF THE INVENTION

This invention concerns a process for alkylating alkylatable aromatic hydrocarbons. Suitable for alkylation in the present process are aromatics such as benzene, toluene, xylenes, etc. Typical of the alkylating agents which may be utilized in the present process are olefins, alkyl halides, and alcohols. More particularly, this invention concerns a process for alkylating alkylatable aromatic hydrocarbons utilizing a catalytic composite comprising from about 60 to about 90 wt. percent of a zeolite having a mordenite crystal structure and containing alumina fixed in combination therewith, which makes possible a substantial improvement in hydrocarbon alkylation processes.

Hydrocarbon alkylation processes are important to the petrochemical and petroleum refining industries. For instance, in the production of styrene, benzene is alkylated with ethylene to form ethylbenzene. An improvement in alkylation processes is an economic and technical benefit which could be widely utilized to aid in producing desired materials.

The catalyst utilized in the process of the present invention is derived from mordenite, a zeolite. Zeolites are crystalline aluminosilicates which are well known in the art of catalyzed hydrocarbon reactions. They have been used as hydrocarbon conversion and cracking catalysts. Zeolites have an ordered crystal structure which consists of cages or cavities interconnected by smaller pores and channels. The pores and channels are of definite size, and are a characteristic of each variety of zeolite. Since the dimensions of the zeolite pores and channels are such that they admit certain molecules but not others, zeolites are sometimes known as molecular sieves, and are used in various ways to take advantage of their unique selective properties. The zeolite crystal structure consists of three-dimensional networks of the fundamental units, which are silicon-centered $SiO_4$ and aluminum-centered $AlO_4$ tetrahedra. These units are interconnected by sharing apical oxygen atoms. To preserve electrochemical neutrality, the $AlO_4$ tetrahedra are associated with a cation, usually sodium. For most catalytic uses of zeolites, the cation is exchanged for a hydrogen ion, giving what is called the acid form of zeolite. The fundamental tetrahedral units are arranged in geometric patterns, describable as chains, layers, or polyhedra, which are characterized by well-defined intracrystalline dimensions. The narrowest cross sections of the various pores and channels within the crystals are essentially uniform.

Mordenite is a highly siliceous zeolite, which, as naturally found or normally synthesized, has a composition in which the $SiO_2/Al_2O_3$ mole ratio is from about 6 to about 12. The crystal structure of mordenite consists of four- and five-member rings of $SiO_4$ and $AlO_4$ tetrahedra arranged to form channels or tubes running parallel to the axis of the crystal. These channels and tubes, being parallel do not intersect, so that they may be entered only at the ends of the channels. This structure is unique to mordenite among the zeolites, and the mordenite structure is often termed two-dimensional in contrast to other zeolites such as faujasite or zeolite A, in which the cages may be entered from three directions. Natural mordenite has strong acid stability because of its high silica content. Its conventional $SiO_2/Al_2O_3$ mole ratio of 6–12 may be increased to as much as 50 or more by acid-leaching alumina from the mordenite while preserving the characteristic mordenite crystal structure. Acid-leached mordenite and caustic-leached mordenite have been prepared, as well as combinations of mordenite such as a dispersion in a carrier material. These preparations have been utilized as catalysts for various hydrocarbon reactions.

Our copending application Ser. No. 20,024 discloses a novel catalyst composition comprising a zeolite having a mordenite crystal structure and containing alumina fixed in combination therewith. Mordenite having substantially the same $SiO_2/Al_2O_3$ mole ratio as that of the catalyst disclosed in our copending application can be prepared by prior art methods such as acid leaching, but the mordenites disclosed in prior art do not yield the improved composition of the catalyst we have disclosed.

SUMMARY OF THE INVENTION

It is an object of this invention to provide a process for alkylating alkylatable aromatic hydrocarbons. More specifically it is an object of this invention to provide an alkylation process utilizing a particular alkylation catalyst. We have developed an aromatic alkylation process utilizing the catalytic composite disclosed in our copending application Ser. No. 20,024. Application Number 20,024 disclosed a catalyst comprising from about 60 to about 90 wt. percent of a zeolite having a mordenite crystal structure and containing alumina fixed in combination therewith which was characterized by a method of preparation.

In one embodiment, this invention relates to a process for alkylating an alkylatable aromatic hydrocarbon with an alkylating agent, which comprises contacting said hydrocarbon, admixed with said agent, at hydrocarbon alkylation conditions, with a catalytic composition comprising from about 60 to about 90 wt. percent of a zeolite having a mordenite crystal structure and containing alumina fixed in combination therewith, which catalytic composite is prepared by (1) heating an amorphous silica-alumina composite at a temperature of from about 140° to about 250°C in a closed vessel and in admixture with an aqueous alkali metal solution, said composite being characterized by a $SiO_2/Al_2O_3$ mole ratio of from about 10 to about 30, and said solution having an alkali metal concentration sufficient to provide an alkali metal/aluminum ratio of from about 1.5 to about 3.5, and forming a zeolite with a mordenite crystal structure and of substantially the same $SiO_2/Al_2O_3$ mole ratio as the amorphous silica-alumina starting material, and (2) heating said zeolite in an alumina sol, thereafter separating excess sol, treating the zeolite-sol product at conditions effecting gelation of the sol, aging the resulting composition in an alkaline medium for a period of at least about 5 hours and thereafter washing, drying and calcining.

In another embodiment, this invention relates to the alkylation of an alkylatable aromatic hydrocarbon by contacting it, admixed with a suitable alkylating agent, with the above-mentioned catalyst at alkylation conditions including a temperature of about 0° to about 500°C, a pressure of about 1 atmosphere to about 200 atmospheres, and a liquid hourly space velocity of about 0.1 to about 30 hr.$^{-1}$, (where the liquid hourly space velocity is defined as the volume of aromatic hydrocarbon plus alkylating agent per hour divided by the volume of catalyst). In a more particular embodiment, the present inventive process relates to the alkylation of an alkylatable aromatic hydrocarbon by placing the aromatic, admixed with a suitable olefinic alkylating agent, in contact with the above-mentioned catalyst at alkylation conditions including a temperature of about 100° to about 400°C, and a pressure of about 10 to about 200 atmospheres.

DETAILED DESCRIPTION OF THE INVENTION

In the manufacture of the catalyst used in the process of this invention, the zeolite component is initially prepared to have a $SiO_2/Al_2O_3$ mole ratio of from about 12 to about 30, and preferably from about 15 to about 25. This is in contrast to conventional mordenite, either naturally-occurring or synthetically-prepared, which commonly has a $SiO_2/Al_2O_3$ mole ratio range of about 6 to about 12. The zeolite employed in the present inventive process is initially prepared to have the desired $SiO_2/Al_2O_3$ mole ratio by employing an amorphous silica-alumina composite as a starting material. The amorphous silica-alumina composite has substantially the $SiO_2/Al_2O_3$ mole ratio desired in the product. One source of amorphous silica-alumina is amorphous cracking catalyst of less than about 13 wt. percent alumina. This catalyst is typically manufactured in several steps, one of which is the formation of an acidic silica sol by acidification of an aqueous sodium silica solution (water glass). It has been observed that the use of silica-alumina, in which the silica has been derived from an acidic silica sol, gives an improves rate of reaction in the formation of the zeolite utilized in the present process. Other steps in the manufacture of the cracking catalyst include gelation of the silica sol, subsequent adjustment of the pH of the resulting slurry to about 3.5, and impregnation with an aluminum salt using an aqueous aluminum sulfate solution. The aluminum sulfate is thereafter hydrolyzed and precipiated. The silica-alumina product from the above steps is commonly slurried with water and spray-dried to yield fine silica alumina microspheres suitable as a starting material in the manufacture of the zeolite component of the catalyst used in the process of this invention.

The use of an amorphous silica-alumina composite wherein the silica is derived from an acidic silica sol is preferred in preparing the catalyst used in the present invention. But an amorphous silica-alumina composite wherein the silica is derived from a basis silica sol may also be utilized. For example, silica- alumina cogels are often prepared by admixing an aqueous sodium silicate solution or sol with an acidic aluminum sulfate solution to form a sol blend with a pH in excess of about 7. The blend is substantially immediately dispersed as droplets in a hot oil bath, aged therein at elevated temperatures, water-washed, dried and calcined.

Regardless of the origin of the amorphous silica-alumina starting material, the silica-alumina composite is heated in admixture with an aqueous alkali metal solution at a temperature of from about 140° to about 250°C. in a closed vessel. The alkali metal solution has an alkali metal concentration sufficient to provide an alkali metal/aluminum weight ratio of from about 1.5 to about 3.5 in the reaction mixture. The alkali metal is usually sodium and the alkali metal solution is suitably an aqueous sodium hydroxide solution. Zeolite yields of 90–100 percent may be obtained after the stirred reaction mixture has been heated for a period of from about 8 to about 24 hours. The zeolite thus prepared has a $SiO_2/Al_2O_3$ mole ratio substantially the same as the amorphous silica-alumina starting materials. While this zeolite may be converted to the hydrogen form by conventional ion-exchange techniques prior to treating with the alumina sol, no particular improvement results therefrom and the zeolite may be utilized in the sodium form.

The catalyst used in the process of the present invention is a zeolite having a mordenite crystal structure and containing alumina fixed in physical and/or chemical combination therewith. This is in contrast to the conventional practice of suspending the zeolite in a refractory oxide. Our catalyst does not presume the presence of any substantial amount of extraneous alumina in its composition.

As stated above, the present inventive process concerns the alkylation of an alkylatable aromatic hydrocarbon with a suitable alkylating agent by contacting the admixed aromatic hydrocarbon and alkylating agent with the above-described catalytic composite at alkylation conditions. Among the hydrocarbons suitable for utilization in the present inventive process are aromatic compounds including benzene, toluene, the xylenes, ethylbenzene, the ethyltoluenes, the trimethylbenzenes, diethylbenzenes, triethylbenzenes, normal propylbenzene, isopropylbenzene, etc., as well as mixtures of the above. Higher molecular weight alkylaromatics are also suitable for use in the present process, including for example, hexylbenzenes, nonylbenzenes, dodecylbenzenes, hexyltoluenes, etc., and mixtures thereof. Hydrocarbon compounds containing condensed aromatic rings may be utilized in the process of the present invention, including such compounds as naphthalene, alkylnaphthalenes, anthracene, alkylanthracenes, phenanthrene, etc., and mixtures thereof. The present inventive process may also be applied to alkylation of hydrocarbon compounds containing more than one aryl group, for instance diphenyl, diphenylmethane, triphenyl, triphenylmethane, etc. Preferred for use in the present inventive process are the benzenes, and benzene in particular is preferred.

Among the alkylating agents suitable within an embodiment of the present invention are mono-olefins, such as ethylene, propylene, 1-butene, 2-butene, isobutylenes, the pentenes, the hexenes, etc. Also suitable as alkylating agents are diolefins, and polyolefins such as butadienes, pentadienes, etc. Also suitable are the cyclo-olefins such as cyclobutene, cyclopentene, etc. Other suitable alkylating agents include alkyl halides having about two or more carbon atoms per molecule.

Typical of the alkyl halides which may be utilized are ethyl fluoride, ethyl chloride, ethyl bromide, the propyl fluorides, the propyl chlorides, the propyl bromides, the butyl halides, the pentyl halides as well as other mono- and poly-halogen-substituted hydrocarbons. Also suitable as alkylating agents within the scope of the present invention are alkylsulfates such as ethyl sulfate, etc., and alkyl phosphates such as ethyl phosphate. Other alkylating agents may be used in the present invention including, for example, ethers such as ethyl, propyl, diethyl and dipropyl ethers, etc. The process of this invention is also applicable where the alkylating agent utilized occurs in dilute concentration, as in petroleum refinery streams, and when alkylating agents occur diluted with such gases as hydrogen, nitrogen, methane, ethane, etc. The present inventive process may be employed by utilizing a batch reaction system, a continuously stirred reaction system or a plug flow reaction system. The aromatic alkylatable hydrocarbon and alkylating agent may be admixed before or after they are processed at alkylation conditions within the alkylation reaction system.

PREFERRED EMBODIMENTS

The catalyst used in preferred embodiments of the process of the present invention is prepared using an amorphous silica-alumina, characterized by a $SiO_2/Al_2O_3$ mole ratio of 20.0 as a starting material. The amorphous material prepared by the acidification of 23.6 liters of 6.9 percent aqueous water glass solution with 2.99 liters of 25 percent sulfuric acid, the final pH being about 4.3. Gelation occurs in about 10 minutes, and 175 cc. of a 15 percent aqueous ammonia solution is added to the resulting slurry to adjust the pH to about 7.7, the temperature being maintained at about 35°C. After about 1 hour, 200 cc. of 25 percent sulfuric acid is added, lowering the pH to 6.5. A preneutralized aluminum sulfate solution, prepared by blending 700 cc. of a 28 percent aqueous ammonia solution with 2,800 cc. of an aqueous aluminum sulfate solution (comprising the equivalent of 6.7 wt. percent $Al_2O_3$), is added to the aqueous silica slurry with stirring, the pH being further lowered to about 3.9. Hydrolysis of the aluminum sulfate is effected at a pH of about 6.5 by the addition of 810 cc. of a 15 percent aqueous ammonia solution. After 1 hour at said pH, the mixture is filtered, reslurried in water and spray-dried.

450 Grams of the spray-dried silica-alumina microspheres (400 grams volatile free, 7.83 wt percent $Al_2O_3$) is admixed with 57.0 grams of sodium hydroxide in aqueous solution (1,500 cc.) and sealed in an autoclave. The autoclave is rotated and heated to a temperature of 200° C. over a 2 hour period and further rotated and heated at 200° C. for 12 hours. The reaction mixture is cooled and filtered to recover the solids product. The product is washed and dried in the described manner.

About 150 grams of said product is heated in about 700 cc. of an aluminum chloride hydrosol using a glass vessel equipped with an overhead reflux condenser. The aluminum chloride hydrosol comprises 12.49 wt. percent alumina, 10.75 wt. percent chloride, and has a specific gravity of 1.3630. The mixture is heated for about 24 hours at reflux conditions (95°-100° C). Thereafter, the zeolite sol product is recovered by filtration. The zeolite-sol includes about 270 cc. (86.4 grams $Al_2O_3$) of sol. The zeolite-sol is slurried with a 15 percent aqueous ammonia solution for about 1 hour and aged in the solution overnight at 95° C. The resulting zeolite-gel product is thereafter further washed with dilute aqueous ammonia until the filtrate is chloride-free. The product is oven-dried at 110° C., pilled, and calcined. Calcination is effected by heating the product in air containing 3 percent water for one hour at 550° C and thereafter in dry air for 1 hour at 550° C. It has been found that when zeolite is admixed with alumina sol prior to being dried at a temperature in excess of about 110° C., so that it retains volatile matter in excess of about 15 percent by weight, the zeolite has an affinity for alumina not otherwise observed. This unusual affinity is evidenced by a greater capacity of the zeolite to fix alumina in physical and/or chemical combination with itself. The affinity is also evidenced by the catalytic properties of the composition as utilized in the process of the present invention.

The alkylatable aromatic hydrocarbon which is preferred for utilization in the process of the present invention is an alkylbenzene or more particularly benzene itself. The alkylating agent preferred for utilization in the present inventive process is a mono-olefin, and particularly preferred is ethylene. In a preferred embodiment of the present invention, the catalyst prepared as described above, is placed in contact with a mixture of benzene and mono-olefin under alkylation conditions which include a pressure of about 10 atmospheres to about 200 atmospheres, and a temperature of about 100° C. to about 400° C., and alkylated product is recovered.

EXAMPLE I

The catalyst is prepared as described in the preferred embodiment, and is placed in a continuous reaction vessel. The alkylation conditions within the reaction vessel include a temperature of about 150°C., and a pressure of about 30 atmospheres. Benzene and ethylene are separately and continuously charged to the reaction vessel, with the ethylene/benzene mole ratio being greater than about 1. The effluent from the reactor is recovered and is found to consist predominantly of ethyl benzene and diethylbenzene with smaller amounts of triethylbenzene, polyethylbenzene, and unreacted benzene.

EXAMPLE II

Catalyst prepared as described in the preferred embodiment is placed in a continuous reaction vessel. Benzene is continuously charged to the reactor. A gas similar to the gas recovered from a petroleum refinery catalytic cracking process is also continuously charged to the reaction vessel, its composition being, on a molar basis, hydrogen about 20 percent, methane about 35 percent, ethylene 10 percent, propylene about 5 percent, and nitrogen about 30 percent. The effluent from the reactor is examined and it is found that substantially all the olefinic hydrocarbons have been combined with benzene to form ethylbenzene, propylbenzene, cumene, di- and polyethylbenzenes, and di- and polypropylbenzenes.

We claim as our invention

1. A process for alkylating an alkylatable aromatic hydrocarbon which comprises contacting said alkylatable hydrocarbon, admixed with an alkylating agent, at aromatic alkylation conditions, with a catalytic composite characterized by the method of preparation which comprises:
   a. heating an amorphous silica-alumina composite at a temperature of from about 140° to about 250°C. in a sealed vessel and in admixture with an aqueous alkali metal solution, said composite being characterized by a $SiO_2/Al_2O_3$ mole ratio of from about 10 to about 30, and said solution having an alkali metal concentration sufficient to provide an alkali metal/aluminum weight ratio of from about 1.5 to about 3.5, and forming a zeolite with a mordenite crystal structure and of substantially the same $SiO_2/Al_2O_3$ mole ratio as the amorphous silica-alumina starting material;
   b. heating said zeolite in an alumina sol, thereafter separating excess sol, treating the zeolite-sol product at conditions effecting gelation of the sol, aging the resulting composition in an alkaline medium for at least about 5 hours and thereafter washing, drying and calcining.

2. The process of claim 1 further characterized with respect to step (a) of the method of preparation of the catalyst in that said amorphous silica-alumina composite is characterized by a $SiO_2/Al_2O_3$ mole ratio of from about 12 to about 25 and that said alkaline metal solution is an aqueous sodium hydroxide solution.

3. The process of claim 1 further characterized with respect to step (b) of the method of preparation of the catalyst in that said zeolite is heated in an aluminum chloride sol at a temperature of from about 75° to about 125° C. for a period of from about 20 to about 700 hours and is aged for a period of from about 10 to about 24 hours at a temperature of from about 75° to about 100° C. in an aqueous ammonia solution and is calcined in air containing from about 1 to about 5 wt. percent water at a temperature of from about 400° to about 600° C. and thereafter in a substantially dry air atmosphere at a temperature of from about 400° to about 600°C.

4. The process of claim 1 further characterized in that said alkylatable hydrocarbon has one aryl group per molecule.

5. The process of claim 1 further characterized in that said alkylating agent is a mono-olefin.

6. The process of claim 1 further characterized in that said alkylatable hydrocarbon is benzene.

7. The process of claim 1 further characterized in that said alkylating agent is ethylene.

8. The process of claim 1 further characterized in that said alkylating agent is a mono-olefin containing 3 carbon atoms per molecule.

9. The process of claim 1 further characterized in that said alkylating agent is an alkyl halide.

10. The process of claim 1 further characterized in that said alkylating agent is an alkyl sulfate.

11. The process of claim 1 further characterized in that said alkylating agent is an alkyl phosphate.

* * * * *